(12) United States Patent
Li et al.

(10) Patent No.: US 10,669,414 B2
(45) Date of Patent: Jun. 2, 2020

(54) PROPYLENE-BASED ELASTOMERS FOR ROOFING COMPOSITIONS AND METHODS FOR PREPARING THE SAME

(71) Applicant: ExxonMobil Chemical Patents Inc., Baytown, TX (US)

(72) Inventors: Liang Li, Shanghai (CN); Felix M. Zacarias, Houston, TX (US); Narayanaswami Dharmarajan, Houston, TX (US); Jan Kalfus, Spring, TX (US); John R. Hagadorn, Houston, TX (US); Peijun Jiang, League City, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 145 days.

(21) Appl. No.: 15/411,217

(22) Filed: Jan. 20, 2017

(65) Prior Publication Data

US 2017/0260378 A1 Sep. 14, 2017

Related U.S. Application Data

(60) Provisional application No. 62/306,253, filed on Mar. 10, 2016.

(51) Int. Cl.
*C08L 23/14* (2006.01)

(52) U.S. Cl.
CPC ......... *C08L 23/14* (2013.01); *C08L 2205/025* (2013.01); *C08L 2205/03* (2013.01)

(58) Field of Classification Search
CPC combination set(s) only.
See application file for complete search history.

(56) References Cited

U.S. PATENT DOCUMENTS

| | | | |
|---|---|---|---|
| 5,286,798 A * | 2/1994 | Davis | C08L 23/0815 525/211 |
| 6,632,509 B1 | 10/2003 | Davis et al. | |
| 6,750,284 B1 | 6/2004 | Dharmarajan et al. | |
| 6,953,828 B2 | 10/2005 | Dharmarajan et al. | |
| 7,589,145 B2 | 9/2009 | Bryant et al. | |
| 7,666,491 B2 | 2/2010 | Yang et al. | |
| 7,749,924 B2 * | 7/2010 | Peng | B32B 27/32 442/38 |
| 7,799,406 B2 * | 9/2010 | Yang | C08J 5/2231 428/141 |
| 7,855,258 B2 | 12/2010 | Datta et al. | |
| 9,434,827 B2 * | 9/2016 | Frei | C08J 5/18 |
| 2004/0242784 A1 * | 12/2004 | Tau | B32B 27/32 525/240 |
| 2006/0046084 A1 * | 3/2006 | Yang | B32B 5/022 428/500 |
| 2007/0208139 A1 | 9/2007 | Raulie et al. | |
| 2007/0277450 A1 | 12/2007 | Raulie | |
| 2009/0124154 A1 * | 5/2009 | Harrington | C08L 23/14 442/329 |
| 2011/0207888 A1 * | 8/2011 | Kolb | C08L 23/142 525/240 |
| 2016/0040044 A1 * | 2/2016 | Lee | B32B 27/08 428/355 EN |
| 2016/0257809 A1 * | 9/2016 | Biondini | E04B 1/942 |

FOREIGN PATENT DOCUMENTS

| | | | |
|---|---|---|---|
| CA | 2 254 133 A | 5/2000 | |
| EP | 1 655 331 | 5/2006 | |
| WO | 2010/115079 | 10/2010 | |
| WO | 2014/001224 | 1/2014 | |
| WO | WO-2014001224 A1 * | 1/2014 | ................ C08L 5/18 |
| WO | 2014/040914 | 3/2014 | |
| WO | 2014/197141 | 12/2014 | |
| WO | 2016/014776 | 1/2016 | |
| WO | 2016/137558 | 9/2016 | |

OTHER PUBLICATIONS

U.S. Appl. No. 15/259,750, Sep. 8, 2016, Li et al.

* cited by examiner

*Primary Examiner* — Nicole M. Buie-Hatcher

(57) ABSTRACT

Provided herein are elastomer blends and membranes including a blend of a propylene-based elastomer, a thermoplastic resin, a flame retardant, and an ultraviolet stabilizer.

19 Claims, 4 Drawing Sheets

PROPYLENE-BASED ELASTOMERS FOR ROOFING COMPOSITIONS AND METHODS FOR PREPARING THE SAME

CROSS-REFERENCE OF RELATED APPLICATIONS

This invention claims priority to and the benefit of U.S. Patent Application Ser. No. 62/306,253, filed Mar. 10, 2016, which is herein incorporated by reference.

FIELD OF THE INVENTION

Described herein are formulations comprising propylene-based elastomers useful in roofing applications, such as thermoplastic roofing applications.

BACKGROUND OF THE INVENTION

Compositions and membranes comprising thermoplastic olefin (TPO) polymers have found widespread use in the roofing industry for commercial buildings. TPO membranes are often fabricated as a composite structure containing a reflective membrane (40 to 60 mils thick) (1 to 1.5 mm thick), a reinforcing polyester scrim fabric (1 to 2 mils thick) (0.03 to 0.05 mm thick), and a pigmented layer (40 to 60 mils thick) (1 to 1.5 mm thick). When the membrane is applied to the roof, the reflective white layer is exposed to sunlight while the pigmented layer (which is underneath the reflective layer) is attached to the roof insulation material.

For roofing and other sheeting applications, the products are typically manufactured as membrane sheets having a typical width of 10 feet (3 meters) or greater, although smaller widths may be available. The sheets are typically sold, transported, and stored in rolls. For roofing membrane applications, several sheets are unrolled at the installation site, placed adjacent to each other with an overlapping edge to cover the roof and are sealed together by a heat welding process during installation. During transport and storage, the rolls can be exposed to extreme heat conditions, such as from 40° C. to 100° C., which can lead to roll blocking of the rolls during storage in ware-house. After installation, the membranes can be exposed during service to a wide range of conditions that may deteriorate or destroy the integrity of the membrane. As such, a membrane is desired that can withstand a wide variety of service temperatures, such as from −40° C. to 40° C.

PCT Publication No. WO 2010/115079A1 is directed to roofing membranes that contain compositions of Formula I that comprises (a) 30 to 50 wt % of a propylene-based elastomer, (b) 9 to 20 wt % of a plastomer, (c) from 7 to 20 wt % of an impact polypropylene-ethylene copolymer, (d) 20 to 35 wt % of magnesium hydroxide, (e) 5 to 10 wt % of titanium dioxide, and (f) 1 to 2 wt % of additives; or compositions of Formula II that comprises (a) 32 to 48 wt % of a propylene-based elastomer, (b) 9 to 18 wt % of a plastomer, (c) 7 to 20 wt % of an impact polypropylene-ethylene copolymer, (d) 25 to 35 wt % of magnesium hydroxide, (e) 4 to 6 wt % of titanium dioxide, (f) 0.75 to 1.5 wt % of UV inhibitor, (g) 0.2 to 0.45 wt % of antioxidant/stabilizer, (h) 0.15 to 0.4 wt % of thermal stabilizer, and (i) 0.1 to 0.2 wt % of lubricant. The propylene-based elastomer used in WO 2010/115079A1 was Vistamaxx™ 6102 and the lubricant used was Asahi AX71 which is a mono or di-stearyl acid phosphate. The roofing membrane in WO 2010/115079A1 is formed around a scrim having reinforcing polyester threads.

PCT Publication No. WO 2014/001224A1 is directed to compositions comprising 40 to 75 wt % of at least one polypropylene-based elastomer and around 25 to 60 wt % of at least one random copolymer of polypropylene. The polypropylene-based elastomers used in WO 2014/001224A1 were Vistamaxx™ 3980, 6102, and 6202.

PCT Publication No. WO 2014/040914A1 is directed to thermoplastic mixtures that comprise at least one impact-resistant polypropylene copolymer and at least one ethylene-1-octene copolymer, where the weight ratio of impact-resistant polypropylene copolymer to ethylene-1-octene copolymer is in the range of 35:65 to 65:35.

PCT Publication No. WO 2016/137558A1 is directed to a roofing membrane composition of a 10-50 wt % of a propylene-based elastomer, 5-40 wt % of a thermoplastic resin, at least one flame retardant, and at least one ultraviolet stabilizer.

U.S. patent Ser. No. 15/259,750, filed on Sep. 8, 2016, is directed to a reactor blend composition for a roofing application of 70-95 wt % of a propylene-based elastomer and 5-30 wt % of an ethylene copolymer.

There still remains a need for roofing membranes that demonstrate flexibility at service temperatures from −40° C. to 40° C. and resistance to roll blocking at elevated temperatures, specifically membranes that are soft (i.e. low modulus).

SUMMARY OF THE INVENTION

Figure 1:
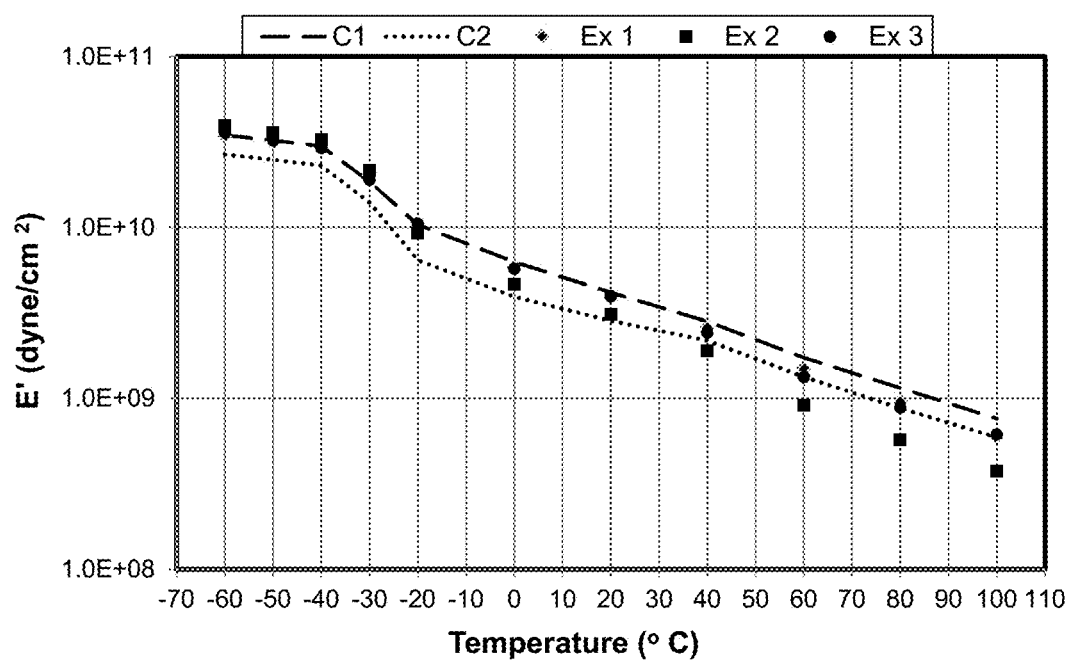
FIG. 1 illustrates the storage modulus (E') of Samples C1, C2, 1, 2, and 3.

Provided here is a propylene-based elastomer blend composition comprising from about 70 wt % to about 95 wt % of a first propylene-based elastomer component, having an ethylene content of greater than or equal to about 17 wt % to less than or equal to about 20 wt % based upon the weight of the propylene-based elastomer blend, and from about 5 wt % to about 30 wt % of a second propylene-based elastomer component, having an ethylene content of greater than or equal to about 6 wt % to less than or equal to about 20 wt % based upon the weight of the propylene-based elastomer blend.

Provided herein is a propylene-based elastomer blend composition comprising from about 70 wt % to about 95 wt % of a first propylene-based elastomer component, having an ethylene content of greater than or equal to about 10 wt % to less than or equal to about 13 wt % based upon the weight of the propylene-based elastomer blend, and from about 5 wt % to about 30 wt % of a second propylene-based elastomer component, having an ethylene content of greater than or equal to about 6 wt % to less than or equal to about 20 wt % based upon the weight of the propylene-based elastomer blend.

Provided herein is a membrane composition comprising from about 20 wt % to about 50 wt % of a propylene-based elastomer blend, comprising (i) from about 70 wt % to about 95 wt % of a first propylene-based elastomer component, having an ethylene content of greater than or equal to about 10 wt % to less than or equal to about 20 wt % based upon the weight of the propylene-based elastomer blend, and (ii) from about 5 wt % to about 30 wt % of a second propylene-based elastomer component, having an ethylene content of greater than or equal to about 6 wt % to less than or equal to about 20 wt % based upon the weight of the propylene-based elastomer blend; from about 20 wt % to about 40 wt % of a thermoplastic resin based on the composition; at least one magnesium hydroxide masterbatch; and at least one ultraviolet stabilizer.

DETAILED DESCRIPTION OF THE INVENTION

Various specific embodiments and versions of the present invention will now be described, including preferred embodiments and definitions that are adopted herein. While the following detailed description gives specific preferred embodiments, those skilled in the art will appreciate that these embodiments are exemplary only, and that the present invention can be practiced in other ways. Any reference to the "invention" may refer to one or more, but not necessarily all, of the embodiments defined by the claims. The use of headings is for purposes of convenience only and does not limit the scope of the present invention.

Described herein are compositions comprising propylene-based elastomers that are suitable for roofing applications, particularly roofing membranes. In preferred embodiments, the compositions comprise a propylene-based elastomer that is a reactor-blended polymer as described herein. In preferred embodiments, the compositions further comprise a polyalphaolefin. The compositions provide a balance of properties over a wide range of temperatures. For example, the compositions exhibit flexibility at temperatures from $-40°$ C. to $40°$ C. and improved properties at elevated temperatures.

All numerical values within the detailed description and the claims herein are modified by "about" or "approximately" the indicated value, and take into account experimental error and variations that would be expected by a person having ordinary skill in the art.

As used herein, the term "copolymer" is meant to include polymers having two or more monomers, optionally, with other monomers, and may refer to interpolymers, terpolymers, etc. The term "polymer" as used herein includes, but is not limited to, homopolymers, copolymers, terpolymers, etc., and alloys and blends thereof. The term "polymer" as used herein also includes impact, block, graft, random, and alternating copolymers. The term "polymer" shall further include all possible geometrical configurations unless otherwise specifically stated. Such configurations may include isotactic, syndiotactic and atactic symmetries. The term "blend" as used herein refers to a mixture of two or more polymers. The term "elastomer" shall mean any polymer exhibiting some degree of elasticity, where elasticity is the ability of a material that has been deformed by a force (such as by stretching) to return at least partially to its original dimensions once the force has been removed.

The term "monomer" or "comonomer," as used herein, can refer to the monomer used to form the polymer, i.e., the unreacted chemical compound in the form prior to polymerization, and can also refer to the monomer after it has been incorporated into the polymer, also referred to herein as a "[monomer]-derived unit". Different monomers are discussed herein, including propylene monomers, ethylene monomers, and diene monomers.

"Reactor grade," as used herein, means a polymer that has not been chemically or mechanically treated or blended after polymerization in an effort to alter the polymer's average molecular weight, molecular weight distribution, or viscosity. Particularly excluded from those polymers described as reactor grade are those that have been visbroken or otherwise treated or coated with peroxide or other prodegradants. For the purposes of this disclosure, however, reactor grade polymers include those polymers that are reactor blends.

"Reactor blend," as used herein, means a highly dispersed and mechanically inseparable blend of two or more polymers produced in situ as the result of sequential or parallel polymerization of one or more monomers with the formation of one polymer in the presence of another, or by solution blending polymers made separately in parallel reactors. Reactor blends may be produced in a single reactor, a series of reactors, or parallel reactors and are reactor grade blends. Reactor blends may be produced by any polymerization method, including batch, semi-continuous, or continuous systems. Particularly excluded from "reactor blend" polymers are blends of two or more polymers in which the polymers are blended ex situ, such as by physically or mechanically blending in a mixer, extruder, or other similar device.

Propylene-Based Elastomer

The polymer blend described herein comprises two or more propylene-based elastomers ("PBEs"). The PBE comprises propylene and from about 5 to about 30 wt % of one or more comonomers selected from ethylene and/or $C_4$-$C_{12}$ α-olefins, and, optionally, one or more dienes. For example, the comonomer units may be derived from ethylene, butene, pentene, hexene, 4-methyl-1-pentene, octene, or decene. In preferred embodiments the comonomer is ethylene. In some embodiments, the propylene-based elastomer composition consists essentially of propylene and ethylene derived units, or consists only of propylene and ethylene derived units. Some of the embodiments described below are discussed with reference to ethylene as the comonomer, but the embodiments are equally applicable to other copolymers with other higher α-olefin comonomers. In this regard, the copolymers may simply be referred to as PBEs with reference to ethylene as the α-olefin.

The PBE may include at least about 5 wt %, at least about 7 wt %, at least about 9 wt %, at least about 10 wt %, at least about 12 wt %, at least about 13 wt %, at least about 14 wt %, at least about 15 wt %, or at least about 16 wt %, α-olefin-derived units, based upon the total weight of the PBE. The PBE may include up to about 30 wt %, up to about 25 wt %, up to about 22 wt %, up to about 20 wt %, up to about 19 wt %, up to about 18 wt %, or up to about 17 wt %, α-olefin-derived units, based upon the total weight of the PBE. In some embodiments, the PBE may comprise from about 5 to about 30 wt %, from about 6 to about 25 wt %, from about 7 wt % to about 20 wt %, from about 10 to about 19 wt %, from about 12 wt % to about 19 wt %, or from about 15 wt % to about 18 wt %, or form about 16 wt % to about 18 wt %, α-olefin-derived units, based upon the total weight of the PBE.

The PBE may include at least about 70 wt %, at least about 75 wt %, at least about 78 wt %, at least about 80 wt %, at least about 81 wt %, at least about 82 wt %, or at least about 83 wt %, propylene-derived units, based upon the total weight of the PBE. The PBE may include up to about 95 wt %, up to about 93 wt %, up to about 91 wt %, up to about 90 wt %, up to about 88 wt %, or up to about 87 wt %, or up to about 86 wt %, or up to about 85 wt %, or up to about 84 wt %, propylene-derived units, based upon the total weight of the PBE.

The PBEs of can be characterized by a melting point (Tm), which can be determined by differential scanning calorimetry (DSC). Using the DSC test method described herein, the melting point is the temperature recorded corresponding to the greatest heat absorption within the range of melting temperature of the sample, when the sample is continuously heated at a programmed rate. When a single melting peak is observed, that peak is deemed to be the "melting point." When multiple peaks are observed (e.g., principle and secondary peaks), then the melting point is deemed to be the highest of those peaks. It is noted that due to the low-crystallinity of many PBEs, the melting point peak may be at a low temperature and be relatively flat, making it difficult to determine the precise peak location. A "peak" in this context is defined as a change in the general slope of the DSC curve (heat flow versus temperature) from positive to negative, forming a maximum without a shift in the baseline where the DSC curve is plotted so that an endothermic reaction would be shown with a positive peak.

The Tm (first melt) of the PBE (as determined by DSC) may be less than about 120° C., less than about 115° C., less than about 110° C., less than about 105° C., less than about 100° C., less than about 90° C., less than about 80° C., less than about 70° C., less than about 65° C., or less than about 60° C. In some embodiments, the PBE may have a Tm of from about 20 to about 110° C., from about 30 to about 110° C., from about 40 to about 110° C., or from about 50 to about 105° C., where desirable ranges may include ranges from any lower limit to any upper limit. In some embodiments, the PBE may have a Tm of from about 40 to about 70° C., or from about 45 to about 65° C., or from about 50 to about 60° C., where desirable ranges may include ranges from any lower limit to any upper limit. In some embodiments, the PBE may have a Tm of from about 80 to about 110° C., or from about 85 to about 110° C., or from about 90 to about 105° C., where desirable ranges may include ranges from any lower limit to any upper limit.

As used herein, DSC procedures for determining Tm is as follows. The polymer is pressed at a temperature of from about 200° C. to about 230° C. in a heated press, and the resulting polymer sheet is annealed, under ambient conditions of about 23.5° C., in the air to cool. About 6 to 10 mg of the polymer sheet is removed with a punch die. This 6 to 10 mg sample is annealed at room temperature (about 23.5° C.) for about 80 to 100 hours. At the end of this period, the sample is placed in a DSC (Perkin Elmer Pyris One Thermal Analysis System) and cooled to about −30° C. to about −50° C. and held for 10 minutes at −50° C. The sample is then heated at 10° C./min to attain a final temperature of about 200° C. The sample is kept at 200° C. for 5 minutes. This is the first melt. Then a second cool-heat cycle (to obtain second melt) is performed, where the sample is cooled to about −30° C. to about −50° C. and held for 10 minutes at −50° C., and then re-heated at 10° C./min to a final temperature of about 200° C. Unless otherwise indicated, Tm and Hp referenced herein refers to first melt.

The PBE can be characterized by its percent crystallinity, as determined by X-Ray Diffraction, also known as Wide-Angle X-Ray Scattering (WAXS). The PBE may have a percent crystallinity that is at least about 0.5, at least about 1.0, at least about 1.5. The PBE may be characterized by a percent crystallinity of less than about 2.0, less than about 2.5, or less than about 3.0. For polyethylene and polyethylene copolymers, WAXS can be used to probe the semi-crystalline nature of these materials. Polyethylene forms crystals that are orthorhombic in nature with unit cell dimensions: a=7.41 Å, a=4.94 Å, a=2.55 Å, and α=β=γ=90°. Polyethylene crystalline unit cells then stack together to form crystallites, and plans of these crystals then diffract incident X-rays. The plans of the crystals that diffract X-rays are characterized by their Miller indices (hkl) and for Polyethylene, the 3 main diffracting planes, which appear as peaks in the WAXS patterns are (110), (200) and (020). The overall extent of crystallinity for these materials is calculated from the area under each (hkl) values divided by the area of the total WAXS trace. The minimum extent of crystallinity required to observe crystals using WAXS techniques is about 0.5 vol %.

Preferably, the PBE has crystalline regions interrupted by non-crystalline regions. The non-crystalline regions can result from regions of non-crystallizable propylene segments, the inclusion of comonomer units, or both. In one or more embodiments, the PBE has a propylene-derived crystallinity that is isotactic, syndiotactic, or a combination thereof. In a preferred embodiment, the PBE has isotactic sequences. The presence of isotactic sequences can be determined by NMR measurements showing two or more propylene derived units arranged isotactically. Such isotactic sequences can, in some cases be interrupted by propylene units that are not isotactically arranged or by other monomers that otherwise disturb the crystallinity derived from the isotactic sequences. In addition to differences in tacticity, the PBE polymer can also have defect structures that are regio-specific.

The PBE can have a triad tacticity of three propylene units (mmm tacticity), as measured by 13C NMR, of 75% or greater, 80% or greater, 85% or greater, 90% or greater, 92% or greater, 95% or greater, or 97% or greater. In one or more embodiments, the triad tacticity may range from about 75 to about 99%, from about 80 to about 99%, from about 85 to about 99%, from about 90 to about 99%, from about 90 to about 97%, or from about 80 to about 97%. Triad tacticity is determined by the methods described in U.S. Pat. No. 7,232,871.

The PBE may have a tacticity index m/r ranging from a lower limit of 4 or 6 to an upper limit of 8 or 10 or 12. The tacticity index, expressed herein as "m/r", is determined by $^{13}$C nuclear magnetic resonance ("NMR"). The tacticity index, m/r, is calculated as defined by H. N. Cheng in Vol. 17, Macromolecules, pp. 1950-1955 (1984), incorporated herein by reference. The designation "m" or "r" describes the stereochemistry of pairs of contiguous propylene groups, "m" referring to meso and "r" to racemic. An m/r ratio of 1.0 generally describes a syndiotactic polymer, and an m/r ratio of 2.0 describes an atactic material. An isotactic material theoretically may have a ratio approaching infinity, and many by-product atactic polymers have sufficient isotactic content to result in ratios of greater than 50.

The comonomer content and sequence distribution of the polymers can be measured using $^{13}$C nuclear magnetic resonance (NMR) by methods well known to those skilled in the art. Comonomer content of discrete molecular weight ranges can be measured using methods well known to those skilled in the art, including Fourier Transform Infrared Spectroscopy (FTIR) in conjunction with samples by GPC, as described in Wheeler and Willis, Applied Spectroscopy, 1993, Vol. 47, pp. 1128-1130. For a propylene ethylene copolymer containing greater than 75 wt % propylene, the comonomer content (ethylene content) of such a polymer can be measured as follows: A thin homogeneous film is pressed at a temperature of about 150° C. or greater, and mounted on a Perkin Elmer PE 1760 infrared spectrophotometer. A full spectrum of the sample from 600 cm−1 to 4000 cm−1 is recorded and the monomer weight percent of ethylene can be calculated according to the following equation: Ethylene wt %=82.585−111.987X+30.045X2, where X is the ratio of the peak height at 1155 cm−1 and peak height at either 722 cm−1 or 732 cm−1, whichever is higher. For propylene ethylene copolymers having 75 wt % or less propylene content, the comonomer (ethylene) content can be measured using the procedure described in Wheeler and Willis. Reference is made to U.S. Pat. No. 6,525,157 which contains more details on GPC measurements, the determination of ethylene content by NMR and the DSC measurements.

The PBE may have a density of from about 0.84 g/cm$^3$ to about 0.92 g/cm$^3$, from about 0.85 g/cm$^3$ to about 0.90 g/cm$^3$, or from about 0.85 g/cm$^3$ to about 0.87 g/cm$^3$ at room temperature, as measured per the ASTM D-1505 test method, where desirable ranges may include ranges from any lower limit to any upper limit.

The PBE can have a melt index (MI) (ASTM D-1238, 2.16 kg@190° C.), of less than or equal to about 10 g/10 min, less than or equal to about 8.0 g/10 min, less than or equal to about 5.0 g/10 min, or less than or equal to about 3.0 g/10 min, or less than or equal to about 2.0 g/10 min. In some embodiments, the PBE may have a MI of from about 0.5 to about 3.0 g/10 min, or from 0.75 to about 2.0 g/10 min, where desirable ranges may include ranges from any lower limit to any upper limit.

The PBE may have a melt flow rate (MFR), as measured according to ASTM D-1238 (2.16 kg weight @ 230° C.), greater than about 0.5 g/10 min, greater than about 1.0 g/10 min, greater than about 1.5 g/10 min, greater than about 2.0 g/10 min, or greater than about 2.5 g/10 min. The PBE may have an MFR less than about 25 g/10 min, less than about 15 g/10 min, less than about 10 g/10 min, less than about 7 g/10 min, or less than about 5 g/10 min. In some embodiments, the PBE may have an MFR from about 0.5 to about 10 g/10 min, from about 1.0 to about 7 g/10 min, or from about 1.5 to about 5 g/10 min, where desirable ranges may include ranges from any lower limit to any upper limit.

The PBE may have a g' index value of 0.95 or greater, or at least 0.97, or at least 0.99, wherein g' is measured at the Mw of the polymer using the intrinsic viscosity of isotactic polypropylene as the baseline. For use herein, the g' index is defined as:

$$g' = \frac{\eta_b}{\eta_l}$$

where $\eta_b$ is the intrinsic viscosity of the polymer and $\eta_l$ is the intrinsic viscosity of a linear polymer of the same viscosity-averaged molecular weight (Mv) as the polymer. $\eta_l = KMv^\alpha$, K and α are measured values for linear polymers and should be obtained on the same instrument as the one used for the g' index measurement.

The PBE may have a Shore D hardness (ASTM D2240) of less than about less than about 50, less than about 45, less than about 40, less than about 35, or less than about 20.

The PBE may have a Shore A hardness (ASTM D2240) of less than about less than about 100, less than about 95, less than about 90, less than about 85, less than about 80, less than about 75, or less than about 70. In some embodiments, the PBE may have a Shore A hardness of from about 10 to about 100, from about 15 to about 90, from about 20 to about 80, or from about 30 to about 70, where desirable ranges may include ranges from any lower limit to any upper limit.

In some embodiments, the PBE is a propylene-ethylene copolymer that has at least four, or at least five, or at least six, or at least seven, or at least eight, or all nine of the following properties (i) from about 10 to about 25 wt %, or from about 12 to about 20 wt %, or from about 16 wt % to about 17 wt % ethylene-derived units, based on the weight of the PBE; (ii) a Tm of from 80 to about 110° C., or from about 85 to about 110° C., or from about 90 to about 105° C.; (iii) a Hf of less than about 75 J/g, or less than 50 J/g, or less than 30 J/g, or from about 1.0 to about 15 J/g or from about 3.0 to about 10 J/g; (iv) a MI of from about 0.5 to about 3.0 g/10 min or from about 0.75 to about 2.0 g/10 min; (v) a MFR of from about 0.5 to about 10 g/10 min, or from 0.75 to about 8 g/10 min, or from about 0.75 to about 5 g/10 min; (vi) a Mw of from about 175,000 to about 260,000 g/mol, or from about 190,000 to about 250,000 g/mol, or from about 200,000 to about 250,000 g/mol, or from about 210,000 to about 240,000 g/mol; (vii) a Mn of from about 90,000 to about 130,000 g/mol, or from about 95,000 to about 125,000 g/mol, or from about 100,000 to about 120,000 g/mol; (viii) a MWD of from about 1.0 to about 5, or from about 1.5 to about 4, or from about 1.8 to about 3; and/or (ix) a Shore D hardness of less than 30, or less than 25, or less than 20. In some embodiments, such a PBE is a reactor-blended PBE as described herein.

Optionally, the PBE may also include one or more dienes. The term "diene" is defined as a hydrocarbon compound that has two unsaturation sites, i.e., a compound having two double bonds connecting carbon atoms. Depending on the context, the term "diene" as used herein refers broadly to either a diene monomer prior to polymerization, e.g., forming part of the polymerization medium, or a diene monomer after polymerization has begun (also referred to as a diene monomer unit or a diene-derived unit). In some embodiments, the diene may be selected from 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; vinyl norbornene (VNB); dicyclopentadiene (DCPD), and combinations thereof. In embodiments where the propylene-based polymer comprises a diene, the diene may be present at from 0.05 wt % to about 6 wt %, from about 0.1 wt % to about 5.0 wt %, from about 0.25 wt % to about 3.0 wt %, or from about 0.5 wt % to about 1.5 wt %, diene-derived units, based upon the total weight of the PBE.

Optionally, the PBE may be grafted (i.e., "functionalized") using one or more grafting monomers. As used herein, the term "grafting" denotes covalent bonding of the grafting monomer to a polymer chain of the propylene-based polymer. The grafting monomer can be or include at least one ethylenically unsaturated carboxylic acid or acid derivative, such as an acid anhydride, ester, salt, amide, imide, acrylates or the like. Illustrative grafting monomers include, but are not limited to, acrylic acid, methacrylic acid, maleic acid, fumaric acid, itaconic acid, citraconic acid, mesaconic acid, maleic anhydride, 4-methyl cyclohexene-1,2-dicarboxylic acid anhydride, bicyclo(2.2.2)octene-2,3-dicarboxylic acid anhydride, 1,2,3,4,5,8,9,10-octahydronaphthalene-2,3-dicarboxylic acid anhydride, 2-oxa-1,3-diketospiro(4.4)nonene, bicyclo(2.2.1)heptene-2,3-dicarboxylic acid anhydride, maleopimaric acid, tetrahydrophthalic anhydride, norbornene-2,3-dicarboxylic acid anhydride, nadic anhydride, methyl nadic anhydride, himic anhydride, methyl himic anhydride, and 5-methylbicyclo(2.2.1)heptene-2,3-dicarboxylic acid anhydride. Other suitable grafting monomers include methyl acrylate and higher alkyl acrylates, methyl methacrylate and higher alkyl methacrylates, acrylic acid, methacrylic acid, hydroxy-methyl methacrylate, hydroxyl-ethyl methacrylate and higher hydroxy-alkyl methacrylates and glycidyl methacrylate. Maleic anhydride is a preferred grafting monomer. In embodiments wherein the graft monomer is maleic anhydride, the maleic anhydride concentration in the grafted polymer is preferably in the range of about 1 wt % to about 6 wt %, at least about 0.5 wt %, or at least about 1.5 wt %.

In preferred embodiments, the PBE is a reactor grade or reactor blended polymer, as defined above. That is, in preferred embodiments, the PBE is a reactor blend of a first polymer component and a second polymer component. Thus, the comonomer content of the PBE can be adjusted by adjusting the comonomer content of the first polymer component, adjusting the comonomer content of second polymer component, and/or adjusting the ratio of the first polymer component to the second polymer component present in the PBE.

In embodiments where the PBE is a reactor blended polymer, the α-olefin content of the first polymer component ("$R_1$") may be greater than 5 wt %, greater than 7 wt %, greater than 10 wt %, greater than 12 wt %, greater than 15 wt %, or greater than 17 wt %, based upon the total weight of the first polymer component. The α-olefin content of the first polymer component may be less than 30 wt %, less than 27 wt %, less than 25 wt %, less than 22 wt %, less than 20 wt %, or less than 19 wt %, based upon the total weight of the first polymer component. In some embodiments, the α-olefin content of the first polymer component may range from 5 wt % to 30 wt %, from 7 wt % to 27 wt %, from 10 wt % to 25 wt %, from 12 wt % to 22 wt %, from 15 wt % to 20 wt %, or from 17 wt % to 19 wt %. Preferably, the first polymer component comprises propylene and ethylene derived units, or consists essentially of propylene and ethylene derived units.

In embodiments where the PBE is a reactor blended polymer, the α-olefin content of the second polymer component ("$R_2$") may be greater than 1.0 wt %, greater than 1.5 wt %, greater than 2.0 wt %, greater than 2.5 wt %, greater than 2.75 wt %, or greater than 3.0 wt % α-olefin, based upon the total weight of the second polymer component. The α-olefin content of the second polymer component may be less than 10 wt %, less than 9 wt %, less than 8 wt %, less than 7 wt %, less than 6 wt %, or less than 5 wt %, based upon the total weight of the second polymer component. In some embodiments, the α-olefin content of the second polymer component may range from 1.0 wt % to 10 wt %, or from 1.5 wt % to 9 wt %, or from 2.0 wt % to 8 wt %, or from 2.5 wt % to 7 wt %, or from 2.75 wt % to 6 wt %, or from 3 wt % to 5 wt %. Preferably, the second polymer component comprises propylene and ethylene derived units, or consists essentially of propylene and ethylene derived units.

In embodiments where the PBE is a reactor blended polymer, the PBE may comprise from 1 to 25 wt % of the second polymer component, from 3 to 20 wt % of the second polymer component, from 5 to 18 wt % of the second polymer component, from 7 to 15 wt % of the second polymer component, or from 8 to 12 wt % of the second polymer component, based on the weight of the PBE, where desirable ranges may include ranges from any lower limit to any upper limit. The PBE may comprise from 75 to 99 wt % of the first polymer component, from 80 to 97 wt % of the first polymer component, from 85 to 93 wt % of the first polymer component, or from 82 to 92 wt % of the first polymer component, based on the weight of the PBE, where desirable ranges may include ranges from any lower limit to any upper limit.

The PBE are preferably prepared using homogeneous conditions, such as a continuous solution polymerization process. In some embodiments, the PBE are prepared in parallel solution polymerization reactors, such that the first reactor component is prepared in a first reactor and the second reactor component is prepared in a second reactor, and the reactor effluent from the first and second reactors are combined and blended to form a single reactor effluent from which the final PBE is separated. Exemplary methods for the preparation of PBEs may be found in U.S. Pat. Nos. 6,881,800; 7,803,876; 8,013,069; and 8,026,323 and PCT Publications WO 2011/087729; WO 2011/087730; and WO 2011/087731, incorporated herein by reference.

Preferably, the first reactor component of the PBE is metallocene-catalyzed or a pyidyl diamide catalyzed and the second reactor component of the PBE is metallocene catalyzed. Where the second reactor component is prepared with the metallocene catalyst, it may be the same or different than the catalyst used to prepare the first reactor component. Preferably, it is the same catalyst. Where the first reactor component is prepared using a pyridyl diamide catalyst, it has the following structural formula:

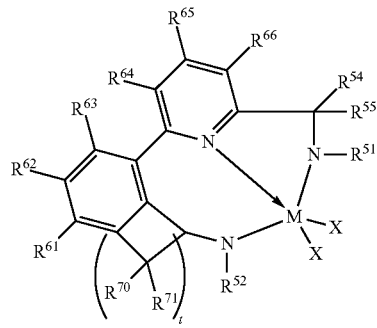

wherein M, X, N, $R^{51}$, $R^{52}$, $R^{54}$, $R^{55}$, $R^{61}$-$R^{66}$ are as previously defined as in formulae (6) and (6a); each $R^{70}$-$R^{71}$ are independently selected from the group consisting of hydrogen, hydrocarbyls, substituted hydrocarbyls, alkoxy, aryloxy, halogen, amino, and silyl, and wherein any one or more adjacent $R^{70}$-$R^{71}$ may be joined to form a substituted or unsubstituted hydrocarbyl or heterocyclic ring, wherein the ring has 5, 6, 7, or 8 ring atoms and where substitutions on the ring can join to form additional rings, and t is 2 or 3 (corresponding to cyclopentyl and cyclohexyl rings, respectively).

In an embodiment of the invention $R^{61}$-$R^{66}$ are hydrogen.

In an embodiment of the invention each $R^{70}$ and $R^{71}$ are independently hydrogen, and t is 2 or 3, preferably 2.

In an embodiment of the invention each $R^{54}$ and $R^{55}$ are independently hydrogen, an alkyl group or an aryl group or substituted aryl group; preferably one or both $R^{54}$ or $R^{55}$ is hydrogen, or one $R^{54}$ or $R^{55}$ is hydrogen and the other is an aryl group or substituted aryl group. Preferred but non limiting aryl groups include phenyl and 2-methylphenyl, 2-ethylphenyl, 2-isopropylphenyl and naphthyl.

In an embodiment of the invention, $R^{52}$ and $R^{51}$ are independently aryl or substituted aryl; preferably $R^{51}$ is a substituted phenyl group such as, but not limited to 2,6-diisopropylphenyl, 2,6-diethylphenyl, 2,6-dimethylphenyl, mesityl, and the like, and preferably $R^{52}$ is phenyl or a substituted phenyl group such as, but not limited to 2-tolyl, 2-ethylphenyl, 2-propylphenyl, 2-trifluoromethylphenyl, 2-fluorophenyl, mesityl, 2,6-diisopropylphenyl, 2,6-diethylphenyl, 2,6-dimethylphenyl, 3,5-di-tert-butylphenyl, and the like.

In an embodiment of the invention, $R^{54}$, $R^{55}$, $R^{61}$-$R^{66}$, each $R^{70}$-$R^{71}$ are hydrogen, $R^{52}$ is phenyl, $R^{51}$ is 2,6-diisopropylphenyl and t is 2.

Non-limiting examples of pyridyl diamide catalysts that are chelated transition metal complexes (type 3) are illustrated below, wherein X is methyl, benzyl, or chloro:

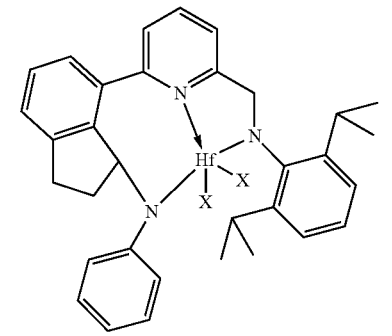

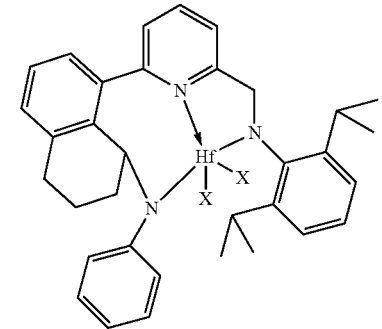

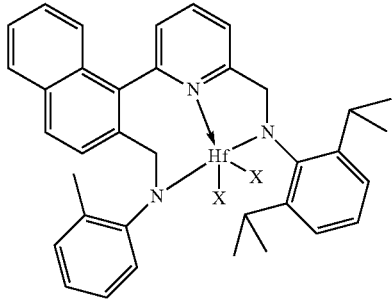

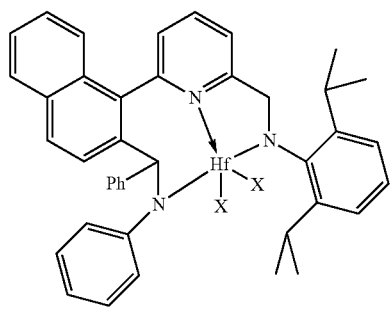

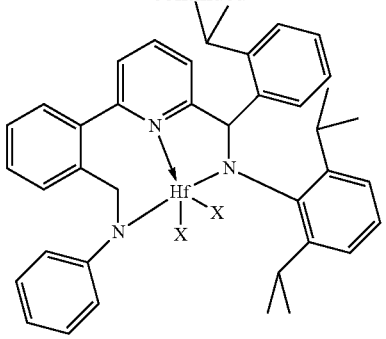

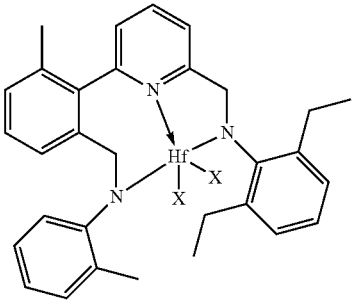

Additional particularly useful chelated transition metal complexes (type 3) including pyridyl diamide transition metal complexes are described in US2014/0221587, US2014/0316089, WO2012/134614, WO2012/134615, WO2012/134613, US2012/0071616, US2011/0301310, and US2010/0022726 and are incorporated herein by reference.

Suitable PBEs for use in the present invention are Vistamaxx™ polymers, commercially available from ExxonMobil Chemical Company. The invention is not limited to the use of Vistamaxx™ as the PBE.

Thermoplastic Resin

The compositions described herein may include one or more olefinic thermoplastic resins. The "olefinic thermoplastic resin" may be any material that is not a "propylene-based elastomer" or an "ethylene-based polymer" as described herein. For example, the thermoplastic resin may be a polymer or polymer blend considered by persons skilled in the art as being thermoplastic in nature, e.g., a polymer that softens when exposed to heat and returns to its original condition when cooled to room temperature. The olefinic thermoplastic resin component may contain one or more polyolefins, including polyolefin homopolymers and polyolefin copolymers. Except as stated otherwise, the term "copolymer" means a polymer derived from two or more monomers (including terpolymers, tetrapolymers, etc.) and the term "polymer" refers to any carbon-containing compound having repeat units from one or more different monomers.

Illustrative polyolefins may be prepared from mono-olefin monomers including, but are not limited to, monomers having 2 to 7 carbon atoms, such as ethylene, propylene, 1-butene, isobutylene, 1-pentene, 1-hexene, 1-octene, 3-methyl-1-pentene, 4-methyl-1-pentene, 5-methyl-1-hexene, mixtures thereof, and copolymers thereof. Preferably, the olefinic thermoplastic resin is unvulcanized or non cross-linked.

In preferred embodiments, the olefinic thermoplastic resin comprises, or consists of, polypropylene. The term "polypropylene" as used herein broadly means any polymer that is considered a "polypropylene" by persons skilled in the art and includes homo, impact, and random copolymers of propylene. Preferably, the polypropylene used in the compositions described herein has a melting point above 110° C. and includes at least 90 wt % propylene-derived units. The polypropylene may also include isotactic, atactic or syndiotactic sequences, and preferably includes isotactic sequences. The polypropylene can either derive exclusively from propylene monomers (i.e., having only propylene-derived units) or comprises at least 90 wt %, or at least 93 wt %, or at least 95 wt %, or at least 97 wt %, or at least 98 wt %, or at least 99 wt % propylene-derived units with the remainder derived from olefins, such as ethylene, and/or $C_4$-$C_{10}$ α-olefins.

The olefinic thermoplastic resin may have a melting temperature of from at last 110° C., or at least 120 C, or at least 130° C., and may range from 110° C. to 170° C. or higher as measured by DSC.

The thermoplastic resin may have a melt flow rate "MFR" as measured by ASTM D1238 at 230° C. and 2.16 kg weight of from about 0.1 to 100 g/10 min. In some embodiments, the thermoplastic resin may have a fractional MFR, such a polypropylene having a fractional MFR of less than about 2 g/10 min, or less than about 1.5 g/10 min, or less than about 1 g/10 min. In some embodiments, the thermoplastic resin may have a MFR of from a low of about 25, 26, 27, 28, 29, 30, 31, 32, or 33 g/10 min to a high of about 37, 38, 39, 40, 41, 42, 43, 44, or 45 g/10 min, where desirable ranges may include ranges from any lower limit to any upper limit. In some embodiments, the thermoplastic resin, such as a polypropylene, may have a MFR of from a low of about 5, 10, or 15 g/10 min to a high of about 20, 25, or 30 g/10 min, where desirable ranges may include ranges from any lower limit to any upper limit.

A suitable thermoplastic resin for use in the present invention is the propylene homopolymers PP7032, commercially available from ExxonMobil Chemical Company. The invention is not limited to the use of PP7032 as the thermoplastic resin.

Fillers and Additives

The compositions described herein may also incorporate a variety of additives. The additives may include reinforcing and non-reinforcing fillers, antioxidants, stabilizers, processing oils, compatibilizing agents, lubricants (e.g., oleamide), antiblocking agents, antistatic agents, waxes, coupling agents for the fillers and/or pigment, pigments, flame retardants, antioxidants, and other processing aids known to the art. In some embodiments, the additives may comprise up to about 65 wt %, or up to about 60 wt %, or up to about 55 wt %, or up to about 50 wt % of the roofing composition. In some embodiments, the additives may comprise at least 5 wt %, or at least 10 wt %, or at least 15 wt %, or at least 20 wt %, or at least 25 wt %, or at least 30 wt %, or at least 35 wt %, or at least 40 wt % of the roofing composition.

In some embodiments, the roofing composition may include fillers and coloring agents. Exemplary materials include inorganic fillers such as calcium carbonate, clays, silica, talc, titanium dioxide or carbon black. Any type of carbon black can be used, such as channel blacks, furnace blacks, thermal blacks, acetylene black, lamp black and the like.

In some embodiments, the roofing composition may include flame retardants, such as calcium carbonate, inorganic clays containing water of hydration such as aluminum trihydroxides ("ATH") or Magnesium Hydroxide. For example, the calcium carbonate or magnesium hydroxide may be pre-blended into a masterbatch with a thermoplastic resin, such as polypropylene, or a polyethylene, such as linear low density polyethylene. For example, the flame retardant may be pre-blended with a polypropylene, an impact polypropylene-ethylene copolymer, or polyethylene, where the masterbatch comprises at least 40 wt %, or at least 45 wt %, or at least 50 wt %, or at least 55 wt %, or at least 60 wt %, or at least 65 wt %, or at least 70 wt %, or at least 75 wt %, of flame retardant, based on the weight of the masterbatch. The flame retardant masterbatch may then form at least 5 wt %, or at least 10 wt %, or at least 15 wt %, or at least 20 wt %, or at least 25 wt %, of the roofing composition. In some embodiments, the roofing composition comprises from 5 wt % to 40 wt %, or from 10 wt % to 35 wt %, or from 15 wt % to 30 wt % flame retardant masterbatch, where desirable ranges may include ranges from any lower limit to any upper limit.

In some embodiments, the roofing composition may include UV stabilizers, such as titanium dioxide or Tinuvin® XT-850. The UV stabilizers may be introduced into the roofing composition as part of a masterbatch. For example, UV stabilizer may be pre-blended into a masterbatch with a thermoplastic resin, such as polypropylene, or a polyethylene, such as linear low density polyethylene. For example, the UV stabilizer may be pre-blended with a polypropylene, an impact polypropylene-ethylene copolymer, or polyethylene, where the masterbatch comprises at least 5 wt %, or at least 7 wt %, or at least 10 wt %, or at least 12 wt %, or at least 15 wt %, of UV stabilizer, based on the weight of the masterbatch. The UV stabilizer masterbatch may then form at least 5 wt %, or at least 7 wt %, or at least 10 wt %, or at least 15 wt %, of the roofing composition. In some embodiments, the roofing composition comprises from 5 wt % to 30 wt %, or from 7 wt % to 25 wt %, or from 10 wt % to 20 wt % flame retardant masterbatch, where desirable ranges may include ranges from any lower limit to any upper limit.

Still other additives may include antioxidant and/or thermal stabilizers. In an exemplary embodiment, processing and/or field thermal stabilizers may include IRGANOX® B-225 and/or IRGANOX® 1010 available from BASF.

Roofing Compositions

The compositions described herein are particularly useful for roofing applications, such as for thermoplastic polyolefin roofing membranes. Membranes produced from the compositions may exhibit a beneficial combination of properties, and in particular exhibit an improved balance of flexibility at temperatures from −40° C. to 40° C. along with stability at elevated temperatures such as those from 40° C. to 100° C.

The roofing compositions described herein may be made either by pre-compounding or by in-situ compounding using polymer-manufacturing processes such as Banbury mixing or twin screw extrusion. The compositions may then be formed into roofing membranes. The roofing membranes may be particularly useful in commercial roofing applications, such as on flat, low-sloped, or steep-sloped substrates.

The roofing membranes may be fixed over the base roofing by any means known in the art such as via adhesive material, ballasted material, spot bonding, or mechanical spot fastening. For example, the membranes may be installed using mechanical fasteners and plates placed along the edge sheet and fastened through the membrane and into the roof decking. Adjoining sheets of the flexible membranes are overlapped, covering the fasteners and plates, and preferably joined together, for example with a hot air weld. The membrane may also be fully adhered or self-adhered to an insulation or deck material using an adhesive. Insulation is typically secured to the deck with mechanical fasteners and the flexible membrane is adhered to the insulation.

The roofing membranes may be reinforced with any type of scrim including, but not limited to, polyester, fiberglass, fiberglass reinforced polyester, polypropylene, woven or non-woven fabrics (e.g., Nylon) or combinations thereof. Preferred scrims are fiberglass and/or polyester.

In some embodiments, a surface layer of the top and/or bottom of the membrane may be textured with various patterns. Texture increases the surface area of the membrane, reduces glare and makes the membrane surface less slippery. Examples of texture designs include, but are not limited to, a polyhedron with a polygonal base and triangular faces meeting in a common vertex, such as a pyramidal base; a cone configuration having a circular or ellipsoidal configurations; and random pattern configurations.

Useful roofing membranes may have a thickness of from 0.1 to 5 mm, or from 0.5 to 4 mm.

The roofing membrane compositions described herein comprise a blend composition of a propylene-based elastomer, thermoplastic resin, at least one flame retardant, and at least one ultraviolet stabilizer. In some embodiments, the blend composition further comprises a polyalphaolefin.

EXAMPLES

In order to provide a better understanding of the foregoing discussion, the following non-limiting examples are offered. Although the examples may be directed to specific embodiments, they are not to be viewed as limiting the invention in any specific respect. All parts, proportions, and percentages are by weight unless otherwise indicated.

The test methods used in the Examples are listed in Table 1 below.

TABLE 1

Test Methods confirm

| Property Tested | ASTM Test Method |
| --- | --- |
| Tensile Stress at Break | ASTM D638 |
| Tensile Strain at Break | ASTM D638 |
| Melt Flow Rate | ASTM D1238 |
| Density | ASTM D1505 |
| 1% Secant Tensile Modulus - MD | ASTM D638 Type IV |
| Stress @ Yield | ASTM D638 Type IV |
| Strain @ Yield | ASTM D638 Type IV |
| 1% Flexural Secant Modulus | ASTM D790 |

Dynamic Mechanical Thermal Analysis ("DMTA") tests were conducted on samples made in the Examples to provide information about the small-strain mechanical response of the sample as a function of temperature. Sample specimens were tested using a commercially available DMA instrument (e.g., TA Instruments DMA 2980 or Rheometrics RSA) equipped with a dual cantilever test fixture. The specimen was cooled to $-70°$ C. and then heated to $100°$ C. at a rate of $2°$ C./min while being subjected to an oscillatory deformation at 0.1% strain and a frequency of 6.3 rad/sec. The output of the DMTA test is the storage modulus (E') and the loss modulus (E"). The storage modulus indicates the elastic response or the ability of the material to store energy, and the loss modulus indicates the viscous response or the ability of the material to dissipate energy.

"PP7032" is ExxonMobil™ PP 7032E2, a polypropylene available from ExxonMobil Chemical Company. PP7032 is a polypropylene impact copolymer having a density of 0.9 g/cc and a melt mass-flow rate (MFR) ($230°$ C.; 2.16 kg) of 4.0 g/10 min (ASTM D1238).

Comparative Polymer A is a propylene-based elastomer containing 16 wt % ethylene-derived units and a melt mass-flow rate (MFR) ($230°$ C.; 2.16 kg) of 3 g/10 min (ASTM D1238).

Comparative Polymer B is a propylene-based elastomer containing 17 wt % ethylene-derived units and a melt mass-flow rate (MFR) ($230°$ C.; 2.16 kg) of 3 g/10 min (ASTM D1238).

"EXACT™9061" is a plastomer available from ExxonMobil Chemical Company. EXACT™9061 is an ethylene-butene plastomer with a melt index ($190°$ C., 2.16 kg) of 0.55 g/10 min and a density of 0.863 g/cc. Comparative formulations include EXACT9061.

The Magnesium Hydroxide Masterbatch used in the examples was Vertex™60 HST from J. M Huber. It contains 70 wt % magnesium hydroxide and 30 wt % of a polypropylene impact copolymer Adflex™ KS 311P from Lyondell Basell.

The White Concentrate Masterbatch used in the examples contains greater than 50 wt % titanium dioxide, with the rest being polypropylene homopolymer.

The UV Stabilizer Masterbatch used in the examples was a masterbatch containing UV stabilizing additives, titanium-dioxide as the white pigment, and a carrier resin, the masterbatch having a density of 1.04 g/cc.

In the Examples, Comparative Polymer A and B are comparative metallocene-catalyzed propylene-ethylene copolymers prepared in a dual reactor. The catalyst used for preparing all of the comparative polymers was 1,1'-bis(4-triethylsilylphenyl)methylene-(cyclopentadienyl)(2,7-di-tertiary-butyl-9-fluorenyl)hafnium dimethyl and the activator was dimethyl-aniliniumtetrakis(pentafluorophenyl) borate. Comparative Polymer A and B were polymerized by the process described herein. Copolymerizations were carried out in a single-phase, liquid-filled, stirred tank reactor with continuous flow of feeds to the system and continuous withdrawal of products under equilibrium conditions. All polymerizations were done in a solvent comprising predominantly C6 alkanes, using soluble metallocene catalysts and discrete, non-coordinating borate anion as co-catalysts. Tri-n-octyl aluminum was used as a scavenger in concentrations appropriate to maintain reaction. Hydrogen, was added, if necessary, to control molecular weight. The hexane solvent was purified over beds of 3A mole sieves and basic alumina. All feeds were pumped into the reactors by metering pumps, except for the ethylene, which flowed as a gas through a mass flow meter/controller. Reactor temperature was controlled adiabatically by controlled chilling of the feeds and using the heat of polymerization to heat the reactor. The reactors were maintained at a pressure in excess of the vapor pressure of the reactant mixture to keep the reactants in the liquid phase. In this manner the reactors were operated liquid full in a homogeneous single phase. Ethylene and propylene feeds were combined into one stream and then mixed with a pre-chilled solvent stream. A mixture of the catalyst components in solvent was pumped separately to the reactor and entered through a separate port. The reaction mixture was stirred aggressively to provide thorough mixing over a broad range of solution viscosities. Flow rates were set to maintain an average residence time in the reactor of about 10 minutes. On exiting the reactor, the copolymer mixture was subjected to quenching, a series of concentration steps, heat and vacuum stripping and pelletization, the general conditions of which are described in International Patent Publication WO 99/45041, incorporated herein by reference in its entirety.

In the Examples, P1-P4 were metallocene-catalyzed copolymers of propylene and ethylene prepared in a single reactor. The catalyst used for preparing P1-P4 was dimethylsilylbis(indenyl)hafnium dimethyl and the activator was dimethylaniliniumtetrakis(heptafluoronaphthyl)borate. P5 is a pyridyl diamide-catalyzed copolymer or propylene and ethylene prepared in a single reactor. The catalyst used for preparing P5 was previously disclosed as Compound 1 in US Patent Publication No. 2015/0141601, incorporated herein by reference, and the activator was dimethylaniliniumtetrakis(pentafluorophenyl)borate. P1-P5 were polymerized by the process described herein.

Polymerizations were carried out in a continuous stirred tank reactor system. A 1-liter autoclave reactor was equipped with a stirrer, a pressure controller, and a water cooling/steam heating element with a temperature controller. The reactor was operated in liquid fill condition at a reactor pressure in excess of the bubbling point pressure of the reactant mixture, keeping the reactants in liquid phase. All feeds (solvent and monomers) were pumped into the reactors by Pulsa feed pumps and the flow rates were controlled using Coriolis mass Flow controller (Quantim series from Brooks) except for the ethylene, which flowed as a gas under its own pressure through a Brooks flow controller. Similarly, H2 feed was controlled using a Brooks flow controller. Ethylene, H2 and propylene feeds were combined into one stream and then mixed with a pre-chilled isohexane stream that had been cooled to at least 0° C. The mixture was then fed to the reactor through a single line. Scavenger solution was added to the combined solvent and monomer stream just before it entered the reactor to further reduce any catalyst poisons. Similarly, activated catalyst solution was fed to the reactor using an ISCO syringe pump through a separated line.

The polymer produced in the reactor exited through a back pressure control valve that reduced the pressure to atmospheric. This caused the unconverted monomers in the solution to flash into a vapor phase which was vented from the top of a vapor liquid separator. The liquid phase, comprising mainly polymer and solvent, was collected for polymer recovery. The collected samples were first air-dried in a hood to evaporate most of the solvent, and then dried in a vacuum oven at a temperature of about 90° C. for about 12 hours. The vacuum oven dried samples were weighed to obtain yields.

Isohexane (solvent), and monomers (ethylene and propylene) were purified over beds of alumina and molecular sieves. Toluene for preparing catalyst solutions was purified by the same technique. An isohexane solution of tri-n-octyl aluminum (TNOA) (25 wt % in hexane, Sigma Aldrich) was used as scavenger solution. The pyridyl diamide catalyst was activated with N,N-dimethyl anilinium tetrakis (pentafluorophenyl) borate at a molar ratio of about 1:1 in 900 ml of toluene. rac-dimethyl silylbis(indenyl)hafnium dimethyl (M1) was activated with N,N-dimethylanilinium tetrakis (heptafluoro-2-naphthyl)borate at a molar ratio of about 1:1 in 900 ml of toluene.

The detailed polymerization process conditions and some characteristic properties are listed in Table 2. The scavenger feed rate was adjusted to optimize the catalyst efficiency and the feed rate varied from 0 (no scavenger) to 15 μmol/min. The catalyst feed rates may also be adjusted according to the level of impurities in the system to reach the targeted conversions listed. All the reactions were carried out at a pressure of about 2.4 MPa/g unless otherwise mentioned. Additional processing conditions for the polymerization process of P1-P4, and the properties of the PBE are included below in Table 2.

TABLE 2

Propylene-based Elastomer Properties and Processing Conditions

| | P1 | P2 | P3 | P4 | P5 |
|---|---|---|---|---|---|
| PBE Properties | | | | | |
| Ethylene Content (wt %) | 17.6 | 18.6 | 9.9 | 7.7 | 11.9 |
| Melt Flow Rate at 230° C., 2.16 kg (g/10 min) | 4.2 | 5.2 | 8.8 | 9.9 | 4.3 |
| Density (g/cc) | 0.861 | 0.859 | 0.878 | 0.878 | 0.862 |
| PBE Processing Conditions | | | | | |
| Polymerization Temperature (° C.) | 60 | 60 | 60 | 65 | 85 |
| Ethylene Feed Rate (L/min) | 1.4 | 1.4 | 0.5 | 0.5 | 0.8 |
| Propylene Feed Rate (g/min) | 14 | 14 | 14 | 14 | 14 |
| Isohexane Feed Rate (g/min) | 56.1 | 56.1 | 56.1 | 56.1 | 56.7 |
| Hydrogen Feed Rate (scc/m) | 0 | 0 | 0 | 0 | 3.62 |
| Catalyst Feed Rate (mol/min) | 1.35E−07 | 1.46E−07 | 1.91E−07 | 1.91E−07 | 1.36E−07 |
| Yield (g/min) | 5.0 | 5.3 | 5.1 | 6.0 | 6.3 |
| Conversion (%) | 32% | 34% | 35% | 41% | 42% |

TPO roofing formulations were compounded in a Brabender® batch mixer. The batch size was 260 g for compounding in the batch mixer.

Compounding in the Brabender® batch mixer was accomplished by first cutting the PBE polymer samples into small strips and introducing them into the pre-heated mixing chamber. The polymer was allowed to flux along with the other compounding ingredients. After the polymer had fluxed and homogenized, the screw speed in the batch mixer was increased to 50 rpm. Mixing was continued for 3 minutes, after which the batch was discharged from the mixing cavity. The compound from the mixer was separated by hand into smaller pieces and allowed to cool under ambient temperature. Formulations prepared either in the extruder or the batch mixer was compression molded into test specimens, and assessed using the appropriate test and methods that are shown in Table 1.

Example 1

In Example 1, samples of the formulations in Table 3 were prepared. The amount of each ingredient in the formulation is listed in Table 3 in weight percent, based on the total weight of the formulation. C1-C4 are comparative samples and Samples 1-6 are inventive. The resulting samples were tested for various properties with the results shown in Table 4.

TABLE 3

Example 1 Formulations

| PBE | | C1 | C2 | 1 | 2 | 3 | C3 | C4 | 4 | 5 | 6 |
|---|---|---|---|---|---|---|---|---|---|---|---|
| Comparative Polymer A | | 36.0 | — | — | — | — | 30.6 | — | — | — | — |
| Comparative Polymer B | | — | 36.0 | — | — | — | — | 30.6 | — | — | — |
| Reactor 1 | | | | | | | | | | | |
| P1 | | — | — | 32.4 | — | — | — | — | 27.5 | — | — |
| P2 | | — | — | — | 32.4 | 27.0 | — | — | — | 27.5 | 23.0 |
| Reactor 1 Ethylene Content of PBE (wt %) | | 17.0 | 18.0 | 17.6 | 18.6 | 18.6 | 17.0 | 18.0 | 17.6 | 18.6 | 18.6 |
| Reactor 2 | | | | | | | | | | | |
| P3 | | — | — | 1.3 | 1.3 | 1.1 | — | — | 1.1 | 1.1 | 0.9 |
| P4 | | — | — | 2.3 | 2.3 | 2.0 | — | — | 2.0 | 2.0 | 1.7 |
| Reactor 2 Ethylene Content of PBE (wt %) | | 5.0 | 5.0 | 8.5 | 8.5 | 8.5 | 5.0 | 5.0 | 8.5 | 8.5 | 8.5 |
| PBE Blend | | | | | | | | | | | |
| PBE Ethylene (wt %) | | 15.8 | 16.7 | 16.7 | 17.5 | 17.5 | 15.8 | 16.7 | 16.7 | 17.5 | 17.5 |
| Polysplit (%) | | 90 | 90 | 90 | 90 | 90 | 90 | 90 | 90 | 90 | 90 |
| EXACT ™9061 | | | | | | | 5.4 | 5.4 | 5.4 | 5.4 | 4.5 |
| PP7032 | | 24.0 | 24.0 | 24.0 | 24.0 | 30.0 | 24.0 | 24.0 | 24.0 | 24.0 | 30.0 |
| Magnesium Hydroxide Masterbatch | | 30.0 | 30.0 | 30.0 | 30.0 | 30.0 | 30.0 | 30.0 | 30.0 | 30.0 | 30.0 |
| UV Stabilizer Masterbatch | | 3.0 | 3.0 | 3.0 | 3.0 | 3.0 | 3.0 | 3.0 | 3.0 | 3.0 | 3.0 |
| White Concentrate Masterbatch | | 7.0 | 7.0 | 7.0 | 7.0 | 7.0 | 7.0 | 7.0 | 7.0 | 7.0 | 7.0 |
| Total (wt %) | | 100 | 100 | 100 | 100 | 100 | 100 | 100 | 100 | 100 | 100 |

Table 3 shows TPO formulations containing commercially available PBE resins and polymers pertaining to this invention. Formulation C1 and C2 are controls formulated with Comparative Polymer A and Comparative Polymer B, respectively. Examples 1 and 2 contain mixtures of PBE resins so that one component, Reactor 1, has ethylene content of 17.6 wt % and 18.6 wt % respectively; while the second component, Reactor 2, has an ethylene content of 8.5 wt %. These examples are illustrated as physical blends to mimic the attributes of a dual reactor polymer, in which the Reactor 1 component is 90 wt % of the polymer, while the Reactor 2 component is 10 wt % of the polymer (i.e., 90% polysplit). In contrast to the inventive formulations which have a Reactor 2 ethylene fraction of 8.5 wt %, the control compounds C1 and C2 have Reactor 2 component at 5 wt % ethylene. Table 4 shows properties of comparative and inventive examples. Inventive Examples 1 and 2 have lower flexural modulus compared to control formulations C1 and C2 respectively. Both tensile stress at break and tensile strain at break are higher in examples 1 and 2 compared to control formulations C1 and C2 respectively.

Control formulations C3 and C4 in Table 3 contain a plastomer component (EXACT™ 9061) to enhance low temperature properties. Examples 4 and 5 are similar formulations as the control examples with the inventive polymers. In Examples 4 and 5, the flexural modulus is lower compared to the control formulations C3 and C4 respectively. In Example 4, both the tensile stress at break and tensile strain at break are higher compared to control formulations C3 and C4 respectively, as shown in Table 4.

TABLE 4

Example 1 Properties

| | | C1 | C2 | 1 | 2 | 3 | C3 | C4 | 4 | 5 | 6 |
|---|---|---|---|---|---|---|---|---|---|---|---|
| Calculated Compound Density | g/cc | 1.063 | 1.063 | 1.064 | 1.063 | 1.063 | 1.063 | 1.063 | 1.064 | 1.063 | 1.066 |
| Melt Flow Rate (230° C., 2.16 kg) | g/10 min | 3.5 | 3.7 | 2.9 | 6.8 | 6.9 | 3.4 | 3.3 | 2.0 | 5.3 | 8 |
| Flexural Modulus: 1% Secant | psi | 52500 | 67500 | 50100 | 42000 | 63400 | 68200 | 55400 | 52800 | 40100 | 62700 |
| Tensile Modulus: 1% Secant | MPa | 298 | 275 | 309 | 234 | 336 | 323 | 284 | 304 | 273 | 365 |
| Tensile Stress at Yield | MPa | 6.2 | 5.4 | 7.7 | 6.8 | 8.1 | 6.4 | 5.7 | 6.6 | 7.2 | 8.1 |
| Tensile Strain at Yield | % | 8.9 | 7.6 | 20.6 | 20.5 | 11.0 | 8.1 | 9.2 | 9.7 | 16.9 | 7.8 |

TABLE 4-continued

| Example 1 Properties | | | | | | | | | | |
|---|---|---|---|---|---|---|---|---|---|---|
| | | C1 | C2 | 1 | 2 | 3 | C3 | C4 | 4 | 5 | 6 |
| Tensile Stress at Break | MPa | 11.9 | 10.4 | 15.8 | 13.3 | 10.9 | 11.9 | 9.5 | 12.5 | 9.6 | 10 |
| Tensile Strain at Break | % | 742 | 717 | 982 | 897 | 449 | 773 | 560 | 784 | 509 | 406 |

Figure 2:
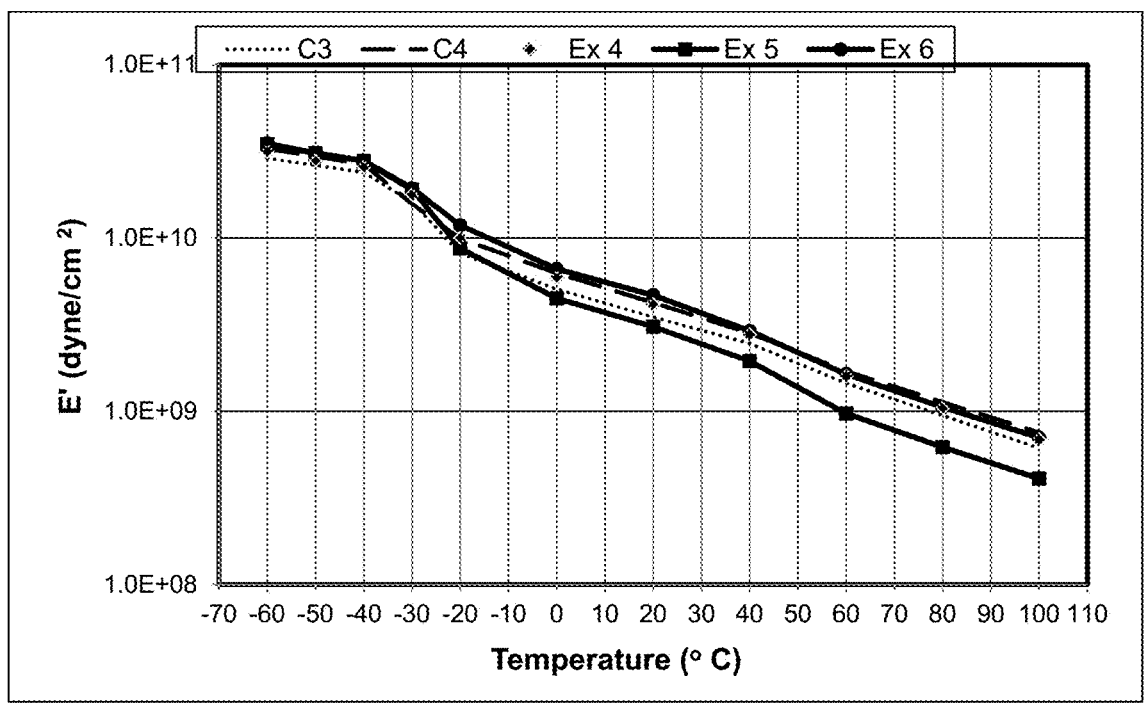
FIG. 2 illustrates the storage modulus (E') of Samples C3, C4, 4, 5, and 6.

FIGS. 1 and 2 show a plot of elastic modulus, E' with temperature. In FIG. 1, both Examples 1 and 2 show similar or lower elastic modulus compared to that of control compound C1 in the temperature range of −40° C. to 40° C. Example 3 is a formulation containing PBE resin, where the Reactor 1 fraction of the PBE is at 18.6 wt % ethylene and the Reactor 2 fraction at 8.5 wt % ethylene. Example 3 formulations contain higher polypropylene impact copolymer content, with the impact copolymer PP7032 (ICP) fraction at 50 wt % by weight of all the polymeric ingredients. Higher ICP fraction results in lower compound cost. By contrast, control formulations C1, C2 and inventive Examples 1 and 2 contain 40% ICP by weight of all the polymeric ingredients. Example 3, with a higher ICP component has either equivalent or lower elastic modulus compared to control Example C1 across the temperature range. FIG. 2 shows the elastic modulus plot for formulations that contain the plastomer component. Example 6, with the higher ICP fraction is equivalent or lower in modulus compared to control formulation C4.

Example 2

In Example 2, samples of the formulations in Table 5 were prepared. The amount of each ingredient in the formulation is listed in Table 5 in weight percent, based on the total weight of the formulation. C1-C4 are comparative samples and Samples 7 and 8 are inventive samples. The resulting samples were tested for various properties with the results shown in Table 6.

TABLE 5

| Example 2 Formulations | | | | | | |
|---|---|---|---|---|---|---|
| PBE | C1 | C2 | 7 | C3 | C4 | 8 |
| Comparative Polymer A | 36.0 | — | — | 30.6 | — | — |
| Comparative Polymer B | — | 36.0 | — | — | 30.6 | — |
| Reactor 1 | | | | | | |
| P5 | — | — | 32.4 | — | — | 27.5 |
| Reactor 1 Ethylene Content of PBE (wt %) | 17.0 | 18.0 | 11.9 | 17.0 | 18.0 | 11.9 |
| Reactor 2 | | | | | | |
| P3 | — | — | 1.3 | — | — | 1.1 |
| P4 | — | — | 2.3 | — | — | 2.0 |
| Reactor 2 Ethylene Content of PBE (wt %) | 5.0 | 5.0 | 8.5 | 5.0 | 5.0 | 8.5 |
| PBE Blend | | | | | | |
| PBE Ethylene (wt %) | 15.8 | 16.7 | 11.6 | 15.8 | 16.7 | 11.6 |
| Polysplit (%) | 90 | 90 | 90 | 90 | 90 | 90 |
| EXACT ™9061 | 0.0 | 0.0 | 0.0 | 5.4 | 5.4 | 5.4 |
| PP7032 | 24.0 | 24.0 | 24.0 | 24.0 | 24.0 | 24.0 |
| Magnesium Hydroxide Masterbatch | 30.0 | 30.0 | 30.0 | 30.0 | 30.0 | 30.0 |
| UV Stabilizer Masterbatch | 3.0 | 3.0 | 3.0 | 3.0 | 3.0 | 3.0 |
| White Concentrate Masterbatch | 7.0 | 7.0 | 7.0 | 7.0 | 7.0 | 7.0 |
| Total (wt %) | 100 | 100 | 100 | 100 | 100 | 100 |

TABLE 6

| Example 2 Properties | | | | | | | |
|---|---|---|---|---|---|---|---|
| | | C1 | C2 | 7 | C3 | C4 | 8 |
| Calculated Compound Density | g/cc | 1.063 | 1.063 | 1.064 | 1.063 | 1.063 | 1.065 |
| Melt Flow Rate (230° C., 2.16 kg) | g/10 min | 3.5 | 3.7 | 3.9 | 3.4 | 3.3 | 3.7 |
| Flexural Modulus: 1% Secant | psi | 52500 | 67500 | 45800 | 68200 | 55400 | 48000 |
| Tensile Modulus: 1% Secant | MPa | 298 | 275 | 260 | 323 | 284 | 270 |
| Tensile Stress at Yield | MPa | 6.2 | 5.4 | 7.3 | 6.4 | 5.7 | 7.3 |
| Tensile Strain at Yield | % | 8.9 | 7.6 | 25.9 | 8.1 | 9.2 | 22.6 |
| Tensile Stress at Break | MPa | 11.9 | 10.4 | 16.7 | 11.9 | 9.5 | 15.1 |
| Tensile Strain at Break | % | 742 | 717 | 935 | 773 | 560 | 905 |

Table 5 shows TPO formulations containing commercially available PBE resins and polymers pertaining to this invention. Formulation C1 and C2 are controls formulated with Comparative Polymer A and Comparative Polymer B, respectively. Example 7 contains mixtures of PBE resins so that one component, Reactor 1 is synthesized with a pyridyl diamide catalyst with an ethylene content of 11.9 wt %; while the second component, Reactor 2 is synthesized with dimethylsilylbis(indenyl)hafnium dimethyl catalyst, with an ethylene content of 8.5 wt %. dimethylaniliniumtetrakis (heptafluoronaphthyl)borate is used as the activator in both cases. These examples are illustrated as physical blends to mimic the attributes of a dual reactor polymer, in which the Reactor 1 component is 90 wt % of the polymer, while the Reactor 2 component is 10 wt % of the polymer. In contrast to the inventive formulation, the control compounds C1 and C2 have Reactor 2 component at 5 wt % ethylene. As shown in Table 6, inventive Examples 7 has a lower flexural modulus compared to control formulations C1 and C2 respectively. The tensile stress at break and elongation to break in Example 7 is higher than control formulation C1 and C2 respectively.

Control formulations C3 and C4 in Table 5 contain a plastomer component (EXACT™9061) to enhance low temperature properties. Example 8 is a formulation similar to the control examples with the inventive polymer. As shown in Table 6, in Example 8 the flexural modulus is lower compared to the control formulations C3 and C4, respectively. In Example 8, both the tensile stress at break and tensile strain at break are higher compared to control formulations C3 and C4, respectively.

Figure 3:
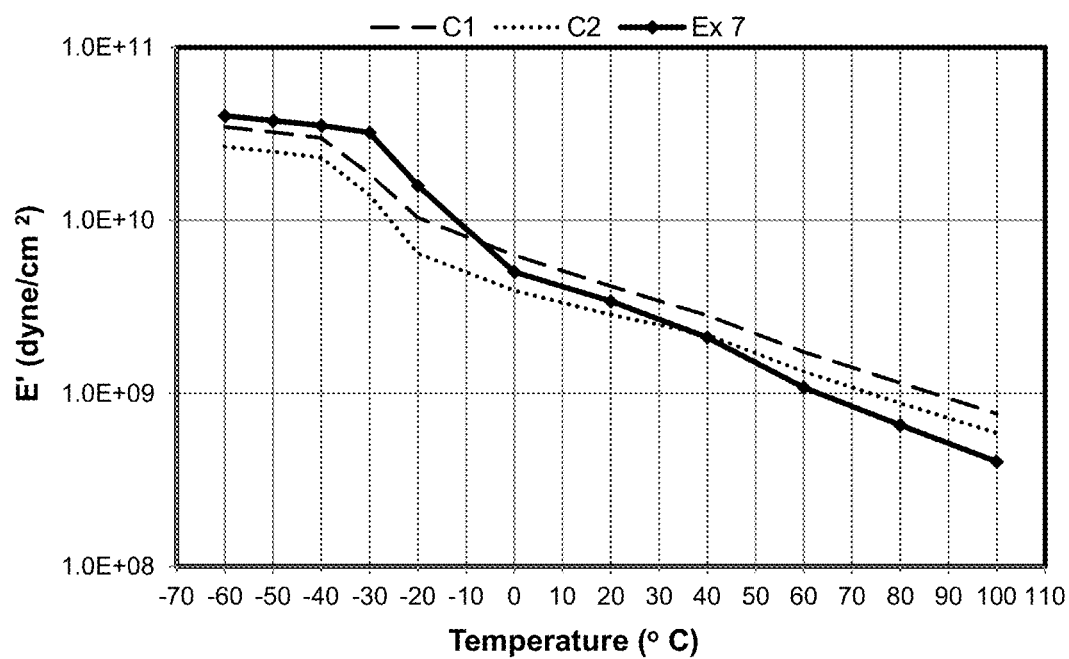
FIG. 3 illustrates the storage modulus (E') of Samples C1, C2, and 7.
Figure 4:
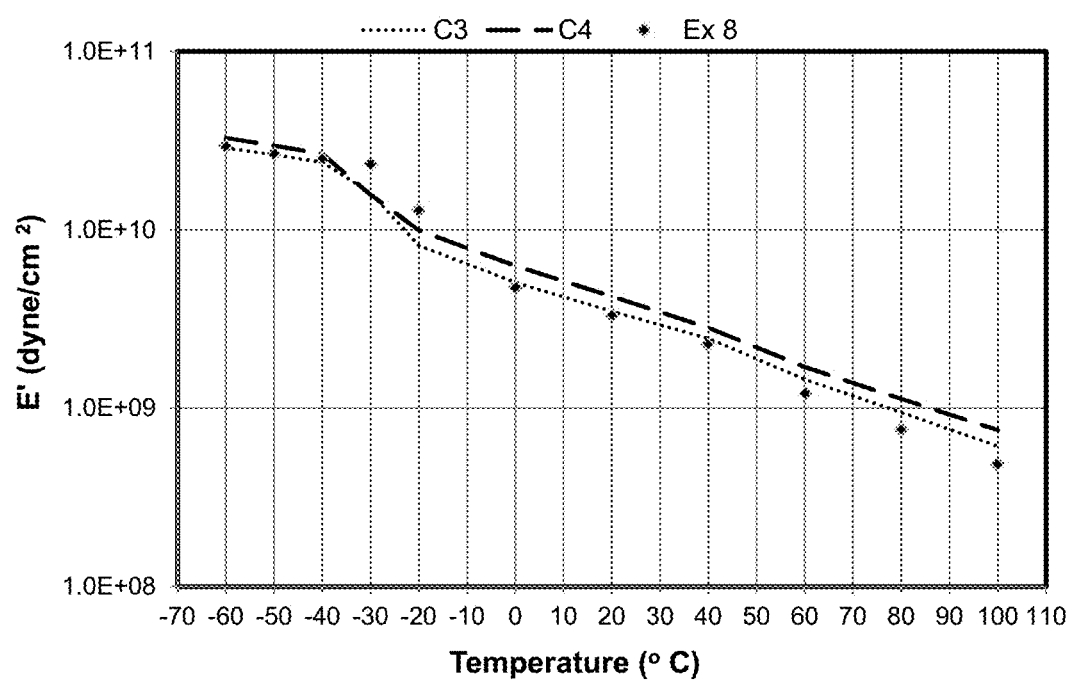
FIG. 4 illustrates the storage modulus (E') of Samples C3, C4, 8.

FIGS. 3 and 4 show a plot of elastic modulus, E' with temperature. In FIG. 3, Example 7 shows similar or lower elastic modulus compared to that of control compound C1 in the temperature range of −10° C. to 40° C. FIG. 4 shows the elastic modulus plot for formulations that contain the plastomer component. Example 8 shows equivalent or lower elastic modulus compared to control formulation C4 in the temperature range of −10° C. to 40° C.

Certain embodiments and features have been described using a set of numerical upper limits and a set of numerical lower limits. It should be appreciated that ranges from any lower limit to any upper limit are contemplated unless otherwise indicated. All numerical values are "about" or "approximately" the indicated value, and take into account experimental error and variations that would be expected by a person having ordinary skill in the art.

As used herein, the phrases "substantially no," and "substantially free of" are intended to mean that the subject item is not intentionally used or added in any amount, but may be present in very small amounts existing as impurities resulting from environmental or process conditions.

To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

We claim:

1. A membrane composition comprising:
(a) from about 20 wt % to about 50 wt % of a propylene-based elastomer blend, comprising:
(i) from about 70 wt % to about 95 wt % of a first propylene-based elastomer component based upon the weight of the propylene-based elastomer blend, having an ethylene content of greater than or equal to about 10 wt % to less than or equal to about 20 wt %, and
(ii) from about 5 wt % to about 30 wt % of a second propylene-based elastomer component based upon the weight of the propylene-based elastomer blend, having an ethylene content of greater than or equal to about 6 wt % to less than or equal to about 20 wt %,
wherein the propylene-based elastomer blend has an ethylene content of from 16 to 18 wt % based upon the weight of the propylene-based elastomer blend;
(b) from about 20 wt % to about 40 wt % of a thermoplastic resin based on the weight of the membrane composition,
wherein the thermoplastic resin comprises a propylene impact copolymer;
(c) at least one magnesium hydroxide masterbatch; and
(d) at least one ultraviolet stabilizer.

2. The membrane of claim 1, wherein the propylene-based elastomer is a reactor blend of the first propylene-based elastomer component and the second propylene-based elastomer component.

3. The membrane of claim 1, wherein the propylene-based elastomer is a physical blend of the first propylene-based elastomer component and the second propylene-based elastomer component.

4. The membrane of claim 1, wherein the thermoplastic resin has a melt flow rate (230° C.; 2.16 kg) of about 2 to about 15 g/10 min.

5. The membrane of claim 1, wherein the thermoplastic resin has a melt flow rate (230° C.; 2.16 kg) of less than about 5 g/10 min.

6. The membrane of claim 1, wherein the thermoplastic resin is present in the composition in the amount of about 20 wt % to about 30 wt %.

7. The membrane of claim 1, where the blend composition comprises from about 10 to about 30 wt % of the magnesium hydroxide masterbatch, based on the weight of the blend composition.

8. The membrane of claim 1, where the blend composition comprises from about 1 to about 10 wt % of the ultraviolet stabilizer, based on the weight of the blend composition.

9. The membrane of claim 1, wherein the first propylene-based elastomer component is prepared using a metallocene catalyst and the second propylene-based elastomer component is prepared using a metallocene catalyst.

10. The membrane of claim 1, wherein the first propylene-based elastomer component is prepared using a pyridyl diamide catalyst and the second propylene-based elastomer component is prepared using a metallocene catalyst.

11. The membrane of claim 10, wherein the pyridyl diamide catalyst has the following structural formula:

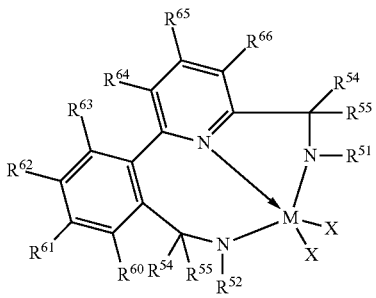

where: M is a group 4 metal; each X is independently a univalent anionic ligand, or two Xs are joined and bound to the metal atom to form a metallocycle ring, or two Xs are joined to form a chelating ligand, a diene ligand, or an alkylidene ligand; $R^{41}$-$R^{44}$ are independently selected from hydrogen, halo, an alkyl, cycloalkyl, heteroalkyl, heterocycloalkyl, aryl or silyl group, provided that one or more adjacent $R^{41}$-$R^{44}$ may be joined together to form a fused ring derivative; $R^{51}$ and $R^{52}$ are independently selected from the group consisting of hydrocarbyls, substituted hydrocarbyls, silylcarbyls and substituted silylcarbyl groups; $R^{54}$ and $R^{55}$ are independently selected from the group consisting of hydrogen, hydrocarbyls, substituted hydrocarbyls, alkoxy, silyl, amino, aryloxy, halogen and phosphino, provided that $R^{54}$ and $R^{55}$ may be joined to form a saturated heterocyclic ring, or a saturated substituted heterocyclic ring where substitutions on the ring can join to form additional rings; and $R^{60}$-$R^{66}$ are independently selected from the group consisting of hydrogen, hydrocarbyls, substituted hydrocarbyls, alkoxy, aryloxy, halogen, amino, and silyl, provided that any one or more adjacent $R^{60}$-$R^{66}$ may be joined to form a substituted or unsubstituted hydrocarbyl or heterocyclic ring, wherein the ring has 5, 6, 7, or 8 ring atoms and where substitutions on the ring can join to form additional rings.

12. The membrane of claim 1, wherein the first propylene-based elastomer component is prepared using a pyridyl diamide catalyst and the second propylene-based elastomer component is prepared using a pyridyl diamide catalyst.

13. The membrane of claim 1, wherein the first propylene-based elastomer component has an ethylene content of greater than or equal to about 10 wt % to less than or equal to about 13 wt % based upon the weight of the propylene-based elastomer.

14. The membrane of claim 1, wherein the first propylene-based elastomer component has an ethylene content of greater than or equal to about 17 wt % to less than or equal to about 20 wt % based upon the weight of the first propylene-based elastomer component.

15. A roofing composition comprising the membrane of claim 1.

16. A membrane composition comprising:
(a) from about 20 wt % to about 50 wt % of a propylene-based elastomer blend, comprising:
  (i) from about 70 wt % to about 95 wt % of a first propylene-based elastomer component based upon the weight of the propylene-based elastomer blend, having an ethylene content of greater than or equal to about 10 wt % to less than or equal to about 20 wt %,
  wherein the first propylene-based elastomer component is prepared using a pyridyl diamide catalyst, and
  (ii) from about 5 wt % to about 30 wt % of a second propylene-based elastomer component based upon the weight of the propylene-based elastomer blend, having greater than or equal to about 6 wt % to less than or equal to about 20 wt %;
(b) from about 20 wt % to about 40 wt % of a thermoplastic resin based on the weight of the membrane composition, wherein the thermoplastic resin is a propylene impact copolymer;
(c) at least one magnesium hydroxide masterbatch; and
(d) at least one ultraviolet stabilizer.

17. The membrane of claim 16, wherein the second propylene-based elastomer component is prepared using a metallocene catalyst.

18. The membrane of claim 16, wherein the second propylene-based elastomer component is prepared using a pyridyl diamide catalyst.

19. The membrane of claim 18, wherein the pyridyl diamide catalyst has the following structural formula:

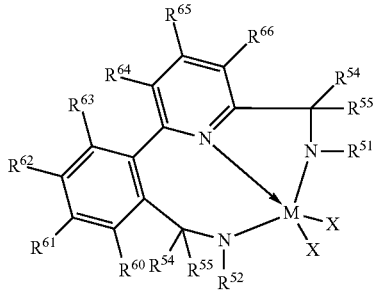

where: M is a group 4 metal; each X is independently a univalent anionic ligand, or two Xs are joined and bound to the metal atom to form a metallocycle ring, or two Xs are joined to form a chelating ligand, a diene ligand, or an alkylidene ligand; $R^{41}$-$R^{44}$ are independently selected from hydrogen, halo, an alkyl, cycloalkyl, heteroalkyl, heterocycloalkyl, aryl or silyl group, provided that one or more adjacent $R^{41}$-$R^{44}$ may be joined together to form a fused ring derivative; $R^{51}$ and $R^{52}$ are independently selected from the group consisting of hydrocarbyls, substituted hydrocarbyls, silylcarbyls and substituted silylcarbyl groups; $R^{54}$ and $R^{55}$ are independently selected from the group consisting of hydrogen, hydrocarbyls, substituted hydrocarbyls, alkoxy, silyl, amino, aryloxy, halogen and phosphino, provided that $R^{54}$ and $R^{55}$ may be joined to form a saturated heterocyclic ring, or a saturated substituted heterocyclic ring where substitutions on the ring can join to form additional rings; and $R^{60}$-$R^{66}$ are independently selected from the group consisting of hydrogen, hydrocarbyls, substituted hydrocarbyls, alkoxy, aryloxy, halogen, amino, and silyl, provided that any one or more adjacent $R^{60}$-$R^{66}$ may be joined to form a substituted or unsubstituted hydrocarbyl or heterocyclic ring, wherein the ring has 5, 6, 7, or 8 ring atoms and where substitutions on the ring can join to form additional rings.

* * * * *